INVENTOR.
DAVID O. McCOY
BY Marvin Moody
ATTORNEY

Patented Sept. 23, 1952

2,611,893

UNITED STATES PATENT OFFICE 2,611,893

HIGH-SPEED SLEWING

David O. McCoy, Cedar Rapids, Iowa, assignor to Collins Radio Company, Cedar Rapids, Iowa, a corporation of Iowa Application March 30, 1951, Serial No. 218,359

7 Claims. (Cl. 343—13)

This invention relates in general to range systems and in particular to a ranging system for radar.

In radar techniques it is desirable to determine two things—(1) the direction of a target and (2) the distance to the target.

The direction of the target is relatively easy to determine in that the antenna may be rotated to point directly toward the target and its angle noted. To determine the distance, however, either a triangulation problem must be solved or the time of travel of an echo from the target must be known. The triangulation method requires two transmitters located at different points and therefore generally the measurement of the time required for the echo to return is used for determining range. Since radio waves travel approximately at the speed of light the time delay before the echo of transmitter pulse is received is equal to twice the time that it took the reflected energy to return from the target. Thus, if the time between transmission of the impulse and reception of the echo is known, the distance to the target may be obtained. For example, it is known that it takes approximately six microseconds for a radio wave to travel 1,000 yards. A frequency of 164 kilocycles per second has a cycle every six microseconds and thus might be used as a time reference base.

It is an object of this invention, therefore, to provide a range system which will swiftly and accurately track a target and indicate its range.

Yet another object of this invention is to provide a ranging system which may be swiftly changed along its distance base to pick up targets which are spaced great distances from each other.

Yet another object of this invention is to provide an improved ranging system for swiftly locating a target.

A feature of this invention is found in the provision for a detent mechanism connected between the coarse and fine range indicators so that the apparatus may be swiftly changed over the limits of the ranging system.

Figure 1:
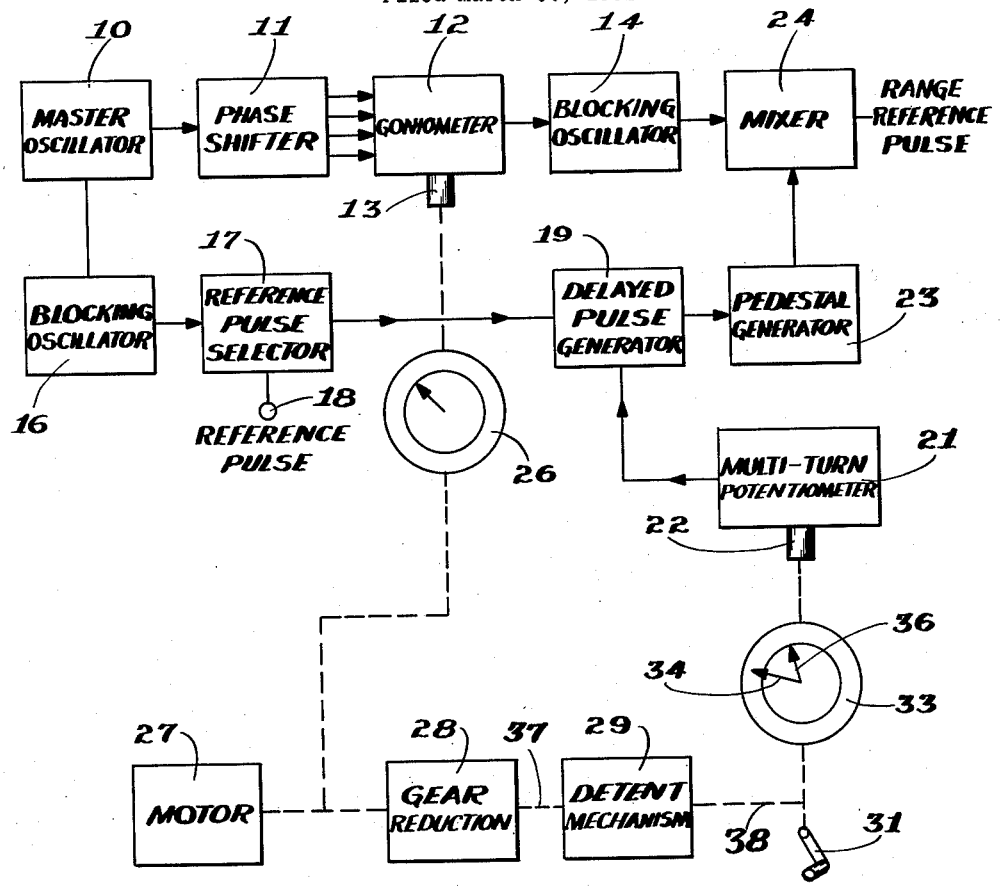
Figure 2:
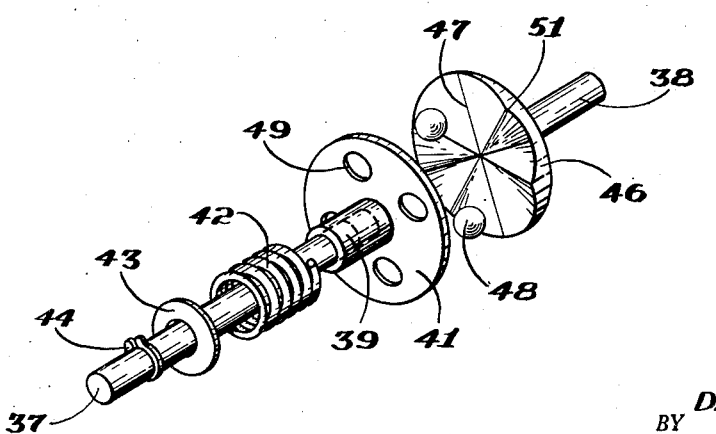

Further objects, features and advantages of this invention will become apparent from the following description and claims when read in view of the drawings in which:

Figure 1 is a schematic illustration of the ranging system of this invention; and, Figure 2 is an exploded view of the detent mechanism of this invention.

Referring to Figure 1, a master oscillator 10 produces an output which might be, for example, 164 kilocycles per second and supplies an output to phase shifter 11. Phase shifter 11 produces four outputs spaced 90 degrees apart and furnishes them to a goniometer 12. The phase shifter 11 produces one output which is in phase with the master oscillator 10 output, and second, third, and fourth outputs which are 90, 180, and 270 degrees displaced from the oscillator output.

The goniometer 12 produces one output of the same frequency as the output of oscillator 10. The phase of the goniometer output is determined by the position of the goniometer's shaft 13. As the shaft 13 is rotated the phase of its output will vary directly as the position of the shaft. The output of goniometer 12 is fed to a blocking oscillator 14 which changes the shape of the sine wave input to pips which are evenly spaced with the time between them being equal to the period of the incoming signal.

A second blocking oscillator 16 receives an output from master oscillator 10 and changes the sine wave output to a plurality of pips with one pip for each cycle of the sine wave. The output of blocking oscillator 16 is furnished to a reference pulse selector 17 which is actuated by a reference pulse supplied to the terminal 18. The reference pulse supplied to the terminal 18 might correspond in time to the transmitter pulse which turns on the transmitter of the radar set. Each time a reference pulse is received at terminal 18 one pip is allowed to pass through selector 17.

A delayed-pulse generator 19 receives an output from the pulse selector 17 and produces an output at a time subsequent to the input. A multi-turn potentiometer 21 furnishes an electrical signal to the delayed-pulse generator 19 to vary the delay time of the delayed pulse generator 19. For example, with various inputs from potentiometer 21, various time delays are obtained in the output of the generator 19. The output of potentiometer 21 is controlled by its shaft position and the shaft 22 may be rotated by suitable driving means.

A pedestal generator 23 receives the output of the generator 19 and produces a pedestal output each time an input is received. A mixer 24 receives an input from the blocking oscillator 14 and the pedestal generator 23 and is biased to cutoff at all times except when a pedestal is supplied from the generator 23. During this time a pulse from the blocking oscillator 14 is allowed to pass through the mixer 24. The pedestal from the generator 23 is slightly longer than the distance between adjoining pips so that each time a pedestal is furnished to mixer 24, at least one pip will be passed. It is to be observed that if a pulse occurs shortly after the reception of the pedestal from the generator 23 that it is possible for two pulses to pass the mixer 24. The first pip passed is used as a range reference pulse and if two pulses are passed, only the first one controls.

The shaft 13 of goniometer 12 is connected to an indicator 26 and to a motor 27. The motor 27 is also connected to a gear reduction 28 which is in turn connected to a detent mechanism 29. The shaft output of the detent mechanism 29 is connected to handle 31 and the shaft 22. An indicator 33 indicates the angular position of the shaft 22.

The output of goniometer 12 determines the fine adjustment of the ranging system and the output of the potentiometer 21 determines the coarse adjustment. For example, if one rotation of the shaft 13 corresponds to a change in range of 1,000 yards, one turn of the potentiometer 21 might correspond to 10,000 yards, so that the shaft 13 turns 10 times each time the shaft 22 is turned once. In this case the gear reduction 28 would be a 10-1 reduction.

The indicator 33 has two pointers 34 and 36 mounted thereon with the pointer 34 making one revolution for each 10,000 yards and the needle 36 making one-tenth of a revolution for each 10,000 yards. Thus, by reading the indicators 33 and 26 the range may be read to plus or minus 10 yards. Suppose that the apparatus is set for a range of around 10,000 yards and it is desired to move out to a range of 70,000 yards. The motor 27 will drive the goniometer 13 and potentiometer 21 until this range is reached, but the indicator 26 will have to make 60 revolutions, while the pointer 34 is making six revolutions and the pointer 36 is making 0.6 of a revolution. Quite a period of time is required to turn indicator 26 sixty revolutions.

It is therefore desirable to provide the detent mechanism 29 which will allow a rapid change for a large range gradient. Thus, the handle 31 is provided to turn the potentiometer 21 while maintaining the goniometer shaft 13 stationary. The detent mechanism 29 is designed to always stop in positions which are synchronized with the goniometer shaft 13 so that no misalignment occurs when the handle 31 is turned.

For example, if it is desired to synchronize shafts 13 and 22 at 1,000 yard position, the detent mechanism must have 10 positions. The shafts may be synchronized every 2,000 yards and this requires only 5 positions of the detent mechanism 27. The calibration of indicators 26 and 33 must also be changed for the different conditions.

As shown in Figure 2, the detent mechanism comprises an input shaft 37 and an output shaft 38. The input shaft 37 has mounted thereon a sleeve 39 which has a plate 41 connected to one end. The shaft 37 is received within the sleeve 39 and a spring 42 is mounted about the shaft 37 and sleeve 39 to engage the plate 41. A washer 43 is mounted on the shaft 37 and a holding means 44 is mounted on the shaft 37 adjacent the washer 43. The spring 42 is fitted down over the sleeve 39 and the washer 43 is slipped down to engage the top of spring 42. The holding means 44 is then tightened to the shaft 37 to hold the spring 42 and washer 43 in place. Thus, the plate 41 and sleeve 39 are always urged away from the end of shaft 37.

The shaft 38 has a plate 46 mounted to its free end and the plate 46 is formed with a plurality of depressions 47. Balls 48 are mounted in the depressions 47 and are engaged by the plate 41. Plate 41 has openings 49 formed therein to receive each ball 48. The openings 49 are slightly smaller than the balls 48 so that they will not pass through. The pressure on the plate 41 caused by the spring 42 will tend to cause the balls 48 to seek the positions on the plate 46 at which they are farthest from the shaft 37. The depressions 47 formed in the plate 46 will thus maintain a predetermined angular relationship between the shafts 37 and 38. If the shaft 37 is prevented from rotating and the shaft 38 is rotated the balls 48 will ride up over the crests 51 between depressions 47 of the plate 46 and will move to the bottom of the adjacent depressions.

As long as the shaft 37 is free to rotate the shafts 37 and 38 will move together for the reason that the spring 42 is strong enough to transfer rotation from shaft 37 to shaft 38. When one of the shafts is held, however, the spring 42 will be compressed sufficiently to allow the balls 48 to ride over into the next depression.

In operation, a reference pulse is received at terminal 18 when the transmitter sends out a pulse, for example. The problem is to measure the time required to receive an echo of the transmitted pulse. The echo returns and the range reference pulse must be "walked along" in time until it is superimposed on the leading edge of the echo. The range reference pulse may be moved or "walked along" by rotation of shafts 13 and 22.

Suppose the target is located 64,500 yards from the transmitter. If shafts 13 and 22 start from 22,000 yards, a relatively long time will be required for the motor 27 to move them out to 64,500 yards. If the operator turns the handle 31 four and two-tenths revolutions, the range unit will be immediately set at 64,000 yards and the motor 27 need only drive shafts 13 and 22 until 500 yards is read on goniometer 13.

The pointers 26, 34 and 36 always indicate the range. For example, at a range of 64,500, pointer 26 will read 500 yards, pointer 34 will read 4,000 yards, and pointer 36 will read 60,000 yards.

It is to be understood that the operator controls motor 27 in both direction of rotation and speed in order to range automatically. For example, in tracking a moving target which has been previously located, the motor 27 will track rapidly enough to follow it. However, if it is desired to change from one target to another with a greatly varying range, the motor is too slow and the operator uses the handle 31.

It is seen that this invention greatly speeds up range changes and aids in measuring the range of new targets rapidly and accurately so that they may be destroyed before reaching a critical location.

Although this invention has been described with respect to a preferred embodiment thereof, it is not to be so limited as changes and modifications may be made therein which are within the full intended scope of the invention as defined by the appended claims.

I claim:

1. Means for quickly making large changes in range comprising, a multi-turn potentiometer with a control shaft that controls the coarse adjustments of range, a goniometer with a control shaft that controls the fine adjustments of range, a driving means connected to the goniometer shaft, a gear reduction connected to said driving means, a detent mechanism connected to said gear reduction, the shaft of said multi-turn potentiometer connected to said detent mechanism, and a crank connected to said multi-turn potentiometer shaft.

2. Means for quickly making large changes in range comprising, a multi-turn potentiometer with a control shaft that controls the coarse adjustments of range, a goniometer with a control shaft that controls the fine adjustments of range, a gear reduction connected to the goniometer shaft, a detent mechanism connected to the opposite side of said gear reduction, the opposite side of said detent mechanism connected to the control shaft of the multi-turn potentiometer, a crank connected to the control shaft of the multi-turn potentiometer, and a driving means connected to the goniometer shaft.

3. Means for quickly making large changes in range comprising, a multi-turn potentiometer with a control shaft that controls the coarse adjustments of range, a goniometer with a control shaft that controls the fine adjustments of range, a crank connected to the shaft of the multi-turn potentiometer, a detent mechanism connected to the shaft of the multi-turn potentiometer, a gear reduction connected to the opposite side of said detent mechanism, the shaft of said goniometer connected to the opposite side of said gear reduction, and a driving means connected to the goniometer shaft for automatic ranging.

4. Means for quickly making large changes in range comprising, a multi-turn potentiometer with a control shaft that controls the coarse adjustments of range, a goniometer with a control shaft that controls the fine adjustments of range, a detent mechanism connected to a gear reduction, said gear reduction and said detent mechanism connected in series between the goniometer shaft and the multi-turn potentiometer shaft, driving means connected to said goniometer shaft, and a crank connected to said multi-turn potentiometer to allow rapid manual changes in range.

5. Means for quickly making large changes in range comprising, a multi-turn potentiometer with a control shaft that controls the coarse adjustments of range, a goniometer with a control shaft that controls the fine adjustments of range, a crank connected to the multi-turn potentiometer shaft to allow rapid manual range changes to be made, a synchronizing detent connected to the multi-turn potentiometer shaft, a gear reduction connected to the opposite side of said detent, the opposite side of said gear reduction connected to said goniometer shaft, and a driving means connected to said goniometer shaft.

6. Means for quickly making large changes in range comprising, a multi-turn potentiometer with a control shaft that controls the coarse adjustments of range, a goniometer with a control shaft that controls the fine adjustments of range, a gear reduction connected to the goniometer shaft and having a reduction ratio equal to the range changing effect of the potentiometer shaft relative to the goniometer shaft, a detent mechanism connected to the opposite side of said gear reduction, the opposite side of said detent mechanism connected to the potentiometer shaft, a crank connected to the potentiometer shaft, and a driving means connected to the goniometer shaft for automatic ranging.

7. Means for quickly making large changes in range comprising, a multi-turn potentiometer with a control shaft that controls the coarse adjustments of range, a goniometer with a control shaft that controls the fine adjustments of range, a gear reduction with a reduction ratio equal to the range effect of the potentiometer shaft to the goniometer shaft connected to said goniometer shaft, a detent mechanism connected to said gear reduction, the opposite side of said detent mechanism connected to said potentiometer shaft, a driving means connected to said goniometer shaft, a crank connected to said potentiometer shaft, and said detent mechanism having a number of steps equal to the gear reduction ratio.

DAVID O. McCOY.

No references cited.